United States Patent [19]

Paetzold

[11] Patent Number: 5,419,616
[45] Date of Patent: May 30, 1995

[54] LOCKING DEVICE FOR A SEAT BACK OF A MOTOR VEHICLE SEAT

[75] Inventor: Reiner Paetzold, Stuttgart, Germany

[73] Assignee: Mercedes-Benz AG, Stuttgart, Germany

[21] Appl. No.: 237,433

[22] Filed: May 3, 1994

[30] Foreign Application Priority Data

May 3, 1993 [DE] Germany .................. 43 14 443.8

[51] Int. Cl.$^6$ .............................................. B60N 2/20
[52] U.S. Cl. ..................... 297/378.12; 292/DIG. 25; 74/501.6; 74/479.01
[58] Field of Search ................ 297/378.12, 378.13, 297/367; 292/225, DIG. 25, 50; 74/501.6, 479 R

[56] References Cited

U.S. PATENT DOCUMENTS 3,822,914  7/1974  Iida et al. .
4,401,077  8/1983  Earl .
4,900,088  2/1990  Bechtle et al. .
5,000,059  3/1991  Barnard .

FOREIGN PATENT DOCUMENTS 3042713A  5/1982  Germany .

Primary Examiner—Kenneth J. Dorner
Assistant Examiner—Anthony Barfield
Attorney, Agent, or Firm—Evenson, McKeown, Edwards & Lenahan

[57] ABSTRACT

A locking device for a seat back of a motor vehicle seat with two unlocking levers pivotably mounted on the seat back frame, one of the levers projecting on the left side and the other on the right side of the seat back from the seat back cushion. The levers are connected by a flexible tensioning element with an unlocking latch pivotably mounted on the seat back frame. To compensate for play in the locking device after the seat back frame has been completely upholstered and for rattle-free mounting of the unlocking levers, the tensioning element has a tensioning cable guided in two separate flexible sheaths. The tension cable is fastened to the first unlocking lever and to the locking latch and is guided at the second unlocking lever over a deflecting roller mounted thereon. The two sheaths are fastened endwise to the seat back frame, with the two ends of the first sheath being mounted near the two unlocking levers and the ends of the second sheath being located near the second unlocking lever and near the locking latch.

12 Claims, 1 Drawing Sheet

LOCKING DEVICE FOR A SEAT BACK OF A MOTOR VEHICLE SEAT

BACKGROUND AND SUMMARY OF THE INVENTION

The invention relates to a locking device for a seat back of a motor vehicle seat.

Folding seat backs for motor vehicle seats allow access to the rear in two-door vehicles. Actuation of the locking device to fold the seat back in the direction of the seat cushion of the seat part is generally accomplished by means of an unlocking lever projecting the door side from the side of the seat back. In vehicles with higher comfort, in addition to the unlocking lever on the door side, an additional unlocking lever is provided on the other side of the seat back so that the driver for example is able to unlock the seat back of the passenger seat from the driver's seat without having to reach behind or over the seat back.

In a known unlocking device of this kind described in German Patent Document DE 30 42 713 A1, the ends of a wire cable are fastened to locking latches pivotably mounted on the left and right sides of the seat back frame, said cable being guided over two segment-shaped guide parts. Each guide part is formed on one of the two unlocking levers at a distance from its pivot point on the seat back frame. Thus, the wire cable runs in two lengthwise segments extending along the length of the sides of the seat back frame and in a transverse section that extends parallel to a cross member connecting the sides of the seat back frame. When the left or right unlocking lever is raised by hand, the guide part moves upward on a circular path around the pivot point of the unlocking lever. As a result, both the lengthwise section running beneath the moved unlocking lever and the opposite lengthwise section of the wire cable are pulled upward, so that the two locking latches are raised and the seat back is unlocked from the seat part.

A tensioning device is provided in the transverse section for exact adjustment of the total length of the wire cable. In this manner, play in the wire cable that can lead to rattling sounds in the pivot levers is eliminated. To compensate for play, the seat back must first be mounted on the seat part while the wire cable with its tensioning device is still freely accessible. Only then can the seat back be completely upholstered.

For reasons of cost and manufacturer, a modular design is desirable nowadays in seat manufacture, with the seat back and seat part being manufactured separately, as regards both their frames and their upholstery, and then assembled. Mechanical systems like the locking device for the seat back must therefore be preinstalled in the seat back before the upholstery is added and must already have been adjusted, since access to the adjusting device along the wire cable is no longer possible afterward.

An object of the invention is to provide a locking device of the type referred to above in which any manufacturing tolerances that remain in the locking device can be compensated even after complete upholstering of the seat back.

This object is achieved in a locking device constructed according to the invention by an arrangement including a locking device for a seat back of a motor vehicle seat, pivotably articulated to a seat part with a seat back flame covered by a seat back cushion, with at least one locking latch, pivotably mounted on the seat back frame, for engaging a locking pin mounted on the seat part, with two unlocking levers pivotably mounted on the seat back frame, one of which levers projects on the left side and the other on the right side of the seat back, each from an opening made in the seat back cushion for manual operation, and with a flexible tensioning element to connect the unlocking lever with the locking latch, wherein the tension element is a tension cable guided in two separate flexible sheaths, one of said sheaths being fastened near the first and second unlocking levers and the second sheath being fastened near the second unlocking lever and the locking latch, each endwise on the seat back frame, and wherein one end of the tension cable is fastened to the first unlocking lever au a distance from its pivot point and the other end of the tension cable is fastened to the locking latch at a distance from its pivot point, said tension cable being guided over a preferably rotatably mounted deflecting roller mounted on the second unlocking lever at a distance from its pivot point.

The locking device according to the invention has the advantage that, due to the continuous tension cable, any tolerances in the locking device that result from one end of the tension cable remaining always accessible at the locking latch can be eliminated by tightening the tension cable, simultaneously preventing any rattling sounds in the unlocking levers, even when pivoting the seat back. When the first unlocking lever is lifted, the tensile forces are conducted by the tension cable that is guided over the deflecting roller on the other pivot lever toward the locking latch. The opposite force thus acting on the roller bearing causes the second unlocking lever to be pulled downward and to be held, rattle-free, in its resting position in the seat back. Lifting the second unlocking lever conducts tensile forces directly into the locking latch. The opposite force in the tension cable means that the first unlocking lever is then puller downward and held, rattle-free, in its resting position n the backrest. The resting positions of the two unlocking levers are therefore always defined exactly.

In a preferred embodiment of the invention, the distance of the mounting point of the tension cable of the first pivot lever from its pivot point on the seat back frame is twice as great as the distance of the bearing point of the deflecting roller on the second pivot lever from its pivot point on the seat back. This means that the actuating forces to be applied to unlock the locking latches are approximately the same at both unlocking levers.

If, according to another embodiment of the invention, the distance of the mounting point of the tension cable on the first pivot lever from its pivot point on the seat back is increased by an additional amount, chosen so that the higher frictional forces acting on the first unlocking lever because of the greater length of the tension cable are compensated, the actuating forces to be applied to both unlocking levers are exactly the same.

In a preferred embodiment of the invention, the pivot levers are designed as single-armed levers and the pivot points of the frame side for the unlocking levers are located at or near one end of the levers. The application point of the tension cable on the first lever and the hearing point of the deflecting roller on the second lever are therefore located between the respective pivot point of the unlocking lever of the vehicle frame and the grip at the end for actuating the unlocking lever.

Other objects, advantages and novel features of the present invention will become apparent from the following detailed description of the invention when considered in conjunction with the accompanying drawings.

BRIEF DESCRIPTION OF THE DRAWING

The single drawing FIGURE schematically depicts a motor vehicle seat back locking device constructed according to a preferred embodiment of the invention.

DETAILED DESCRIPTION OF THE PREFERRED EMBODIMENTS

Figure 1:
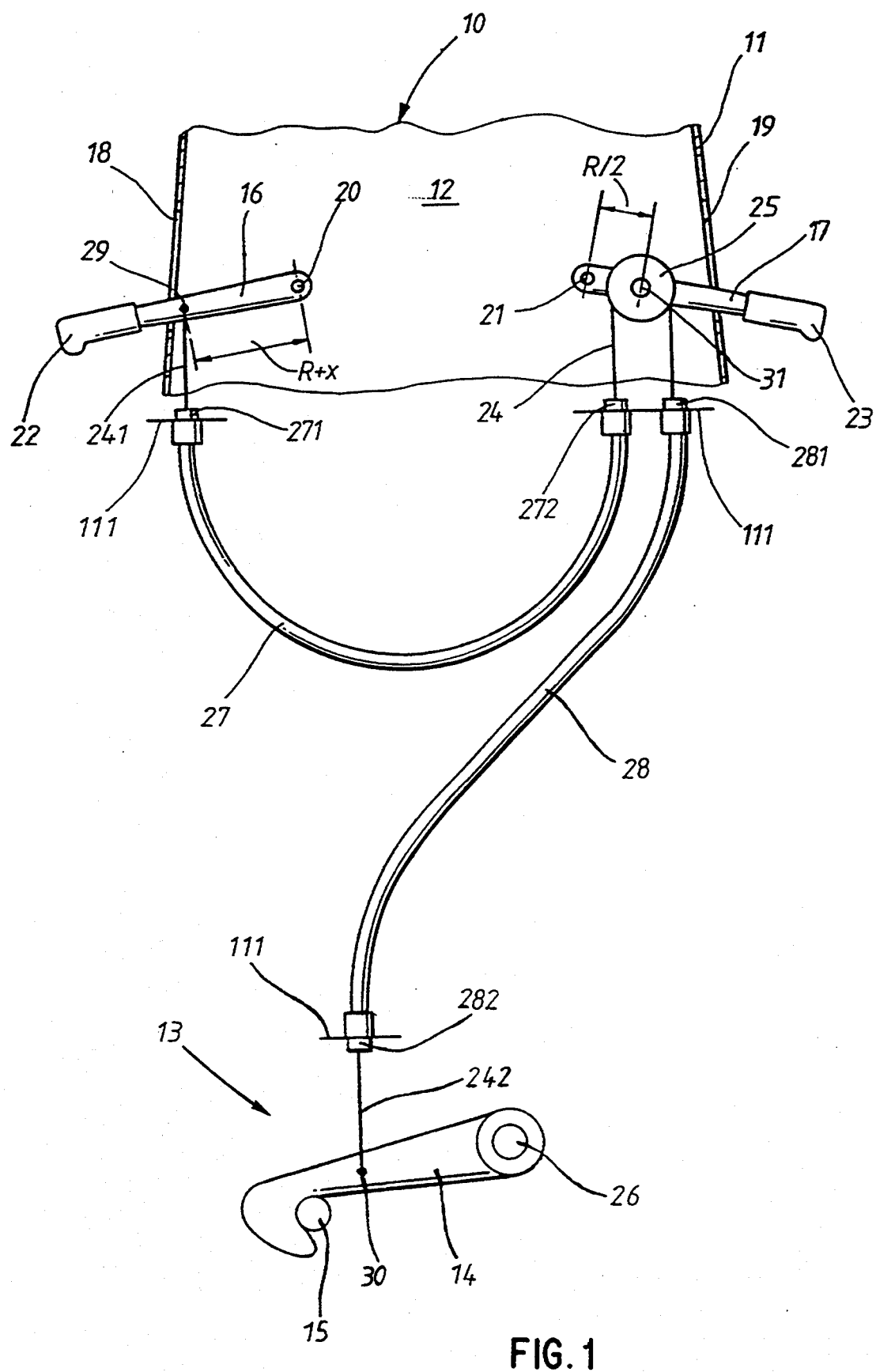

FIG. 1 shows s seat back 10 of a motor vehicle seat in a front view, in portions and schematically. Reference number 11 indicates the metal seat back frame and 12 is a seat back cushion completely surrounding seat back frame 11 in known fashion. As is known, seat back frame 11 is articulated pivotably on a seat part of the motor vehicle seat, not shown here, so that seat back 10 can be folded forward from its operating position in the direction of the seat cushion of the seat part, to allow access to the rear seats of the vehicle.

To keep seat back 10 in its operating position, a locking device 13 is provided that has at least one locking latch 14 pivotably mounted on seat back frame 11, said latch fitting over a rigidly mounted locking pin 15 on the seat part when seat back 10 is in the operating position. In this position, seat back 10 is rigidly held to the seat part and can only be folded after locking latch 14 has been swung away from locking pin 15. Locking latch 14 and locking pin 15 are shown in the drawing as rotated through 90° in the plane of the drawing. As a rule, two locking latches 14 and two locking pins 15 are provided on each vehicle seat, with the locking latches 14 being articulated on both sides of seat back frame 11 and the locking pins 15 projecting transversely from both sides of the seat part.

Locking device 13 includes two unlocking levers 16 and 17 movably mounted to pivot on seat back frame 11 and projecting through openings 18 and 19 in seat back cushion 12 from the sides of seat back cushion 12. Unlocking levers 16, 17 are designed as one-armed levers, with each lever having its pivot point 20 or 21 at one end and a handle 22 or 23 at the other end. The two unlocking levers 16, 17 are connected with locking latches 14 by a tension cable 24 that can be made for example as a wire cable. Tension cable 24 has one end 241 at mounting point 29 on first unlocking lever 16 at a distance from its pivot point 20, is guided over a deflecting roller 25 mounted on second unlocking lever 17 at a distance from its pivot point 21 at bearing point 31, and fastened at its other end 242 to locking latch 14 at a distance from its rotational axis 26 at mounting point 30.

Tension cable 24 is guided in two separate flexible sheaths 27, 28, with first sheath 27 being fastened at one end 271 near first unlocking lever 16 and fastened at its other end 272 near second unlocking lever 17 along the path of the tension cable ahead of deflecting roller 25 on seat back frame 11, while second sheath 28 is likewise fastened to seat back frame 11 at one end 281 near second unlocking lever 17 along the path of the tension cable downstream from deflecting roller 25 and fastened at its other end 282 near locking latch 14. The parts of seat back frame 11 for fastening the ends of sheaths 271, 272, 281, 282 to seat back frame 11 are indicated schematically in the drawing by crosshatching and marked 111. The distance of bearing point 31 of deflecting roller 25 on second unlocking lever 17 from its pivot point 21 on seat back frame 11 is R/2, while the distance of the mounting point of tension cable 24 on first unlocking lever 16 from its pivot point 20 is R+x. Dimension x is set so that the increased frictional forces that appear at first unlocking lever 16 when it is actuated, because of the greater length of the tension cable, in comparison to the frictional forces on second unlocking lever 17 when it is actuated, are compensated. This dimensioning of the distances means that the actuating forces at the two unlocking levers 16, 17 for pivoting locking latches 14 away from locking pins 15 are the same.

On lifting first unlocking lever 16, the tensile forces are conducted from tension cable 24 over deflecting roller 25 to locking latch 14. Deflecting roller 25 thereby merely deflects the tensile force. The opposite force that then acts through bearing point 31 of deflecting roller 25 on first unlocking lever 16 causes second unlocking lever 17 to be pressed against the lower edge of opening 19 and Lcmain, rattle-free, in its resting position. On lifting second unlocking lever 17, the tensile force is conducted directly to locking latch 14. Here, deflecting roller 25 acts as an idler roller. The opposite force transmitted by tension cable 24 on first unlocking lever 16 means that first unlocking lever 16 is pulled against the lower edge of opening 18, so that unlocking lever 16 is held, rattle-free, in its resting position, Existing manufacturing tolerances in locking device 13 can be compensated after assembly of seat back 10 and the seat part during the fastening of end 242 of the tension cable to locking latch 14 at fastening point 30 by appropriately tightening tension cable 24. Then, even in the operating position of seat back 10 and in the locking state of locking lever 14, the two unlocking levers 16, 17 abut the lower edge of openings 18, 19, rattle-free.

Tension cable 24 with two flexible sheaths 27, 28 for its guidance can be in the form of a Bowden cable for example, which in known fashion has a wire cable guided in a flexible tube. The flexible tube is then supported endwise near first unlocking lever 16 and near locking latch 14 on seat back frame 11. The tube is cut in the vicinity of second unlocking lever 17 and a portion removed. The two cutting points in the tube are mounted ahead of and behind reflecting roller 25 in seat back frame 11.

When there are two Locking latches 14 on seat back 10, either the two locking latches 14 can be rigidly coupled to one another or a second identical tension cable 24 with sheaths 27, 28 can be connected with unlocking levers 16, 17 and with the other locking latch 14. The second tension cable is then guided over a separate reflecting roller 25, located on the opposite side of second unlocking lever 17 at bearing point 31.

What is claimed is:

1. A seat with a locking device for use in motor vehicle in a vehicle, said seat having a seat part with a seat back frame covered by a seat back cushion, said locking device comprising:
   a locking pin mounted on the seat part;
   at least one locking latch, pivotably mounted on the seat back frame, for engaging said locking pin;
   two unlocking levers pivotably mounted on the seat back frame, a first of said two levers projecting on the left side and a second of said two levers projecting on the right side of the seat back, each of said two levers projecting from an opening made in the seat back cushion for manual operation of said two levers;

a flexible tensioning element to connect said two unlocking levers with the locking latch;

wherein the flexible tensioning element is a tension cable guide din two separate flexible sheaths, a first of said two sheaths being fastened near the first and second unlocking levers and the second of said two sheaths being fastened near the second unlocking lever and the locking latch, each endwise on the seat back frame; and wherein one end of the tension cable is fastened to the first unlocking lever at a distance from its pivot point and the other end of the tension cable is fastened to the locking latch at a distance from its pivot point;

a rotatably mounted deflecting roller mounted on the second unlocking lever at a distance from its pivot point, said tension cable being guided over the deflecting roller.

2. Device according to claim 1, wherein the distance of the mounting point of the tension cable on the first unlocking lever from its pivot point on the seat back frame is twice the distance of the bearing point of the deflecting roller on the second pivot lever from its pivot point on the seat back frame.

3. Device according to claim 2, wherein the unlocking levers are designed as one-armed levers, and wherein the locking lever pivot points on the seat back frame sides of the unlocking levers are located at or near one end of said respective levers.

4. Device according to claim 2, wherein the tension element with the tension cable and the flexible sheaths is formed by a Bowden cable with flexible tubes and a wire cable, one flexible tube section being fastened endwise near the first unlocking lever and the locking latch on the seat back frame, and by the wire cable having one end fastened to the first unlocking lever and its other end fastened to the locking latch, and wherein the flexible tube is cut in the vicinity of the second unlocking lever and partially removed and the two cut ends of the flexible tube are located before and after the deflecting roller on the seat back frame.

5. Device according to claim 1, wherein the distance of the mounting point of the tension cable on the first unlocking lever from its pivot point on the seat back frame is more than twice the distance of the bearing point of the deflecting roller on the second pivot lever from its pivot point on the seat back frame, wherein an amount of said distance more than twice the distance of the bearing point of the deflecting roller on the second pivot lever from its pivot point is selected such that the higher frictional forces that appear at first unlocking lever because of the greater length of the tension cable are compensated.

6. Device according to claim 3, wherein the unlocking levers are designed as one-armed levers, and wherein the locking lever pivot points on the seat back frame sides of the unlocking levers are located at or near one end of said respective levers.

7. Device according to claim 6, wherein the tension element with the tension cable and the flexible sheaths is formed by a Bowden cable with flexible tubes and a wire cable, one flexible tube section being fastened endwise near the first unlocking lever and the locking latch on the seat back frame, and by the wire cable having one end fastened to the first unlocking lever and its other end fastened to the locking latch, and wherein the flexible tube is cut in the vicinity of the second unlocking lever and partially removed and the two cut ends of the flexible tube are located before and after the deflecting roller on the seat back frame.

8. Device according to claim 3, wherein the tension element with the tension cable and the flexible sheaths is formed by a Bowden cable with flexible tubes and a wire cable, one flexible tube section being fastened endwise near the first unlocking lever and the locking latch on the seat back frame, and by the wire cable having one end fastened to the first unlocking lever and its other end fastened to the locking latch, and wherein the flexible tube is cut in the vicinity of the second unlocking lever and partially removed and the two cut ends of the flexible tube are located before and after the deflecting roller on the seat back frame.

9. Device according to claim 1, wherein the unlocking levers are designed as one-armed levers, and wherein the locking lever pivot points on the seat back frame sides of the unlocking levers are located at or near one end of said respective levers.

10. Device according to claim 4, wherein the tension element with the tension cable and the flexible sheaths is formed by a Bowden cable with flexible tubes and a wire cable, one flexible tube section being fastened endwise near the first unlocking lever and the locking latch on the seat back frame, and by the wire cable having one end fastened to the first unlocking lever and its other end fastened to the locking latch, and wherein the flexible tube is cut in the vicinity of the second unlocking lever and partially removed and the two cut ends of the flexible tube are located before and after the deflecting roller on the seat back frame.

11. Device according to claim 1, wherein the tension element with the tension cable and the flexible sheaths is formed by a Bowden cable with flexible tubes and a wire cable, one flexible tube section being fastened endwise near the first unlocking lever and the locking latch on the seat back frame, and by the wire cable having one end fastened to the first unlocking lever and its other end fastened to the locking latch, and wherein the flexible tube is cut in the vicinity of the second unlocking lever and partially removed and the two cut ends of the flexible tube are located before and after the deflecting roller on the seat back frame.

12. Device according to claim 1, wherein the tension cable is a Bowden cable, wherein a first flexible tube surrounds the Bowden cable and extends between tube mounting positions adjacent the first unlocking lever and the second unlocking lever, and wherein a second flexible tube surrounding the Bowden cable extends between the tube mounting position adjacent the second unlocking lever and the mounting position adjacent the locking latch.

* * * * *